United States Patent Office 2,725,370
Patented Nov. 29, 1955

2,725,370

COPOLYMER OF ACRYLONITRILE AND MONO-ALLYL AND MONOMETHALLYL ETHERS OF GLYCERINE

John R. Caldwell, Kingsport, Tenn., assignor to Eastman Kodak Company, Rochester, N. Y., a corporation of New Jersey No Drawing. Application February 23, 1951,
Serial No. 212,500

16 Claims. (Cl. 260—85.5)

This invention relates to resinous copolymers of acrylonitrile with monoallyl ethers of glycerine, and to a process for their preparation.

It is known that organic compounds containing two or more allyl groups in their molecules on complete polymerization yield substantially infusible and insoluble resins. This result is ascribed to the tendency of such compounds to cross-link linear chains as the polymerization proceeds. For example, in U. S. 2,332,461 to Muskat et al., dated October 19, 1943, it is shown that the diallyl and triallyl ethers of glycerol on complete polymerization give products which are transparent, hard and substantially infusible and insoluble in common organic solvents. G. F. D'Alelio, in U. S. 2,437,508, dated March 9, 1948, shows that various copolymers of acrylonitrile with allyl allyloxyacetate give in each case products which are thermoset, infusible and insoluble. Such cross-linked products have a limited use, particularly in the manufacture of fibers where a solution of the polymers in a volatile organic solvent is very desirable.

I have now found that acrylonitrile can be copolymerized with monoallyl or with monomethallyl glycerine ethers and that the resulting copolymers, even when containing from 8 to 30%, but preferably from 12 to 20% by weight of the monoallyl or the monomethallyl ether of glycerine, are readily soluble in volatile solvents such as dimethyl formamide, diethyl formamide, dimethyl acetamide, ethylene cyanohydrin, and the like. Such solutions can be extruded through multi-hole spinnerettes into aqueous or organic liquid spinning baths to give strong, elastic fibers. The new polymers are thermoplastic and can also be molded by injection or compression methods to give hard, tough products. The new polymers, in contrast to the lack of dyeability of polyacrylonitrile fibers to dark shades with direct cotton dyes, with insoluble vat dyes or with cellulose acetate dyes, can be readily dyed with the above classes of dyes. Furthermore, the new polymers show improved moisture absorption because of the presence of free hydroxyl groups.

It is, accordingly, an object of the invention to provide a new class of useful resinous copolymers. A further object is to provide a new copolymer from which high quality fibers and yarns can be made. A further object is to provide a process for preparing such copolymers and fibers and yarns. Other objects will become apparent hereinafter.

In accordance with my invention, I prepare copolymers of acrylonitrile and monoallyl ether of glycerine or copolymers of acrylonitrile and monomethallyl ether or glycerine by polymerizing a mixture of monomeric acrylonitrile and monomeric monoallyl ether of glycerine or a mixture of monomeric acrylonitrile and monomeric monomethallyl ether of glycerine. The polymerization is advantageously carried out in the presence of a polymerization catalyst, e. g., a peroxide polymerization catalyst. Suitable catalysts include benzoyl peroxide, acetyl peroxide, potassium persulfate, sodium persulfate, hydrogen peroxide, etc. Mixtures of catalysts can be employed.

The polymerizations can be carried out in bulk (mass) in solvents or in heterogenous dispersion where the mixture of monomers is dispersed in a nonsolvent for the monomers, the particles of dispersed monomers being very small (emulsion) or relatively large (bead or granular). From 0.05 to 2.0% of catalyst, based on the weight of monomers, is efficacious. In bulk or mass polymerization, the organic peroxide catalysts are advantageously employed. In solvent polymerization, the organic peroxide catalysts are also advantageously employed. Suitable solvents include methanol, ethanol, isopropanol, acetone, ethyl acetate, etc. Mixtures of solvents can be employed.

For emulsion polymerization, any nonsolvent for the mixture of monomers can be employed, water being especially advantageous. The mixture of monomers can be advantageously emulsified in the water, using emulsifying agents such as salts of higher fatty acids, e. g., sodium or potassium stearate, palmitate, etc., or ordinary soaps, salts of higher fatty alcohol sulfates, e. g., sodium or potassium cetyl sulfate, sodium or potassium lauryl sulfate, sodium or potassium oleyl sulfate, sodium or potassium stearyl sulfate, etc., salts of aromatic sulfonic acids, e. g., sodium or potassium salts of alkylnapthalene sulfonic acids, etc., higher molecular weight quaternary ammonium salts, e. g., dimethylbenzylphenyl chloride, quaternary ammonium salts containing the radicals $C_{15}H_{31}$ and $C_{17}H_{35}$, etc. Mixtures of emulsifying agents can be employed. The emulsions can be coagulated by the addition of an inorganic salt, for example, sodium sulfate, and the precipitated resin then washed and dried.

For bead or granular polymerization, relatively poor dispersing agents such as starch, methylated starch, gum arabic, polyvinyl alcohol, partly hydrolyzed polyvinyl acetate, gelatin, sodium cellulose glycolate, etc., can be employed. Mixtures of dispersing agents can be employed.

All the polymerizations are accelerated by heat, a temperature range of 40° to 70° C. over a period of an hour to 24 hours being efficacious. However, temperatures up to 100 to 110° C. can be employed, if desired. Where the polymerization is carried out in a solvent, the concentration of the monomers can vary from 2 to 50 parts by weight of the monomers to from 98 to 50 parts by weight of solvent, but the best operating efficiency is obtained with a concentration of about 10 parts by weight of the monomers to 90 parts by weight of the solvent. The polymerizations wherein the mixture of monomers is dispersed in a nonsolvent are facilitated by stirring, shaking or tumbling the mixture of monomers and nonsolvent.

In emulsion or solution polymerization, the proportion of monoallyl ether of glycerine or of monomethallyl ether of glycerine in the resinous product has been found to be approximately one-half the proportion of such ethers contained in the starting polymerization mixture. For example, with a polymerization mixture containing 80 parts by weight of acrylonitrile and 20 parts by weight of the monoallyl or monomethallyl ether, as the sole polymerizable materials in the mixture, the resinous product resulting therefrom has been found to contain approximately 90 parts by weight of acrylonitrile and 10 parts by weight of the ether. However, in mass polymerization, the proportion of monoallyl ether of glycerine or of monomethallyl ether of glycerine to acrylonitrile is substantially the same as their proportions in the polymerization mixture in the range of from 8 to 30 parts by weight of such ethers to from 92 to 70 parts by weight of acrylonitrile.

The intermediate monoallyl and monomethallyl ethers of glycerine can be conveniently made by reacting allyl and methallyl chlorides with the monosodium derivative of glycerine. The compounds can also be made by the hydrolysis of glycidyl alphaallyl or methallyl ether.

The compounds prepared as above had the following physical constants. Glycerine monoallyl ether, B. P. 84.5° C./1 mm. pressure and refractive index of 1.4627 at 20° C. Glycerine monomethallyl ether, B. P. 86° C./1 mm. pressure and density 1.4632 at 20° C.

The following examples will serve to illustrate further the manner of obtaining my new compounds:

*Example 1*

25 g. of acrylonitrile, 6 g. of monoallyl ether of glycerine, 2 g. of sodium lauryl sulfate, 0.2 g. of potassium persulfate and 90 cc. of water were mixed together and stirred at 55° C. for 18 hours to give an emulsion polymer. The emulsion was coagulated with sodium sulfate and the precipitated resin washed with water and dried. A yield of 26 g. of product was obtained. Analysis of the product gave 24% by weight of nitrogen which corresponds to an acrylonitrile unit content in the copolymer of 90% by weight, the remainder of the copolymer being monoallyl ether of glycerine units. The resinous product was soluble in dimethyl acetamide. A dope of 15 parts by weight of the resin in 85 parts by weight of dimethyl acetamide was extruded through a multi-hole spinnerette into a bath consisting of 70 parts by weight of water and 30 parts by weight of dimethyl acetamide. The precipitated filaments were washed with water, dried at 110° C. and drafted 600% in a steam chamber at 160° to 180° C. The yarn had a tensile strength of 3.5 g. per denier and elongation of 21%. It was readily dyed to desired colors with vat dyes and cellulose acetate dyes.

*Example 2*

25 g. of acrylonitrile, 6 g. of monomethallyl ether of glycerine, 2 g. of sodium lauryl sulfate, 0.2 g. of potassium persulfate and 90 cc. of water were mixed together and stirred at 55° C. for 18 hours to give an emulsion polymer. The emulsion was coagulated with sodium sulfate and the precipitated resin washed with water and dried. A good yield of resinous product containing 90% by weight of acrylonitrile units, the remainder being monomethallyl ether of glycerine units, was obtained. The product was soluble in dimethyl acetamide. Filaments obtained by extrusion as described in Example 1 had similarly good properties and were readily dyeable with vat dyes and with cellulose acetate dyes.

*Example 3*

24 g. of acrylonitrile, 8 g. of monoallyl ether of glycerine, 0.2 g. of potassium persulfate, 0.2 g. of sodium bisulfite, 1 g. of phosphoric acid and 250 cc. of water were mixed together and stirred at 65° C. for 6 hours. The precipitated copolymer was filtered off, washed and dried to give a yield of 25 g. Analysis of the copolymer gave 23% by weight of nitrogen corresponding to a composition of 87% by weight of acrylonitrile units. The resin was spinnable to give strong, elastic fibers of good dyeing properties in vat dyes and in cellulose acetate dyes.

*Example 4*

75 g. of acrylonitrile, 25 g. of monoallyl ether of glycerine and 1.5 g. of benzoyl peroxide were mixed together and the mixture then heated at 50° C. for 24 hours. A hard, tough copolymeric resin was produced. The resin can be granulated and then molded by injection and compression methods. The resin was soluble in dimethyl acetamide and had a softening point above 160° C.

In place of the monoallyl ether of glycerine in the above example, there can be substituted an equivalent weight of monomethallyl ether of glycerine to give a similarly tough and hard copolymeric resin which is granularable and moldable by injection and compression methods. It had a softening point above 140° C. and was soluble in dimethyl acetamide.

Proceeding as set forth in the above examples, other resinous copolymers can be prepared such as those containing by weight 8 parts, 12 parts, 16 parts, 20 parts, 24 parts, 28 parts or 30 parts of monoallyl ether of glycerine or monomethallyl ether of glycerine, the remainder of the copolymer being acrylonitrile in each case. As previously mentioned, all of the new resinous copolymers are soluble in one or more volatile organic solvents. Such dopes can be extruded to monofilaments which can be spun to yarn or coated on film-forming smooth surfaces from which on evaporation of the solvent, tough, flexible films or sheet materials can be stripped off and cured. The dopes can also contain fillers, dyes, etc. The resinous copolymers of the invention can also be made into molding compositions, with or without plasticizers, fillers, dyes, etc., from which composition excellent molded objects can be prepared by the various molding methods.

What is claimed is:

1. A copolymer of from 70 to 92% by weight of acrylonitrile and from 30 to 8% by weight of a compound selected from the group consisting of monoallyl ether of glycerine and monomethallyl ether of glycerine.

2. A copolymer of from 80 to 88% by weight of acrylonitrile and from 20 to 12% by weight of monoallyl ether of glycerine.

3. A copolymer of from 80 to 88% by weight of acrylonitrile and from 20 to 12% by weight of monomethallyl ether of glycerine.

4. A copolymer of 90% by weight of acrylonitrile and 10% by weight of monoallyl ether of glycerine.

5. A copolymer of 90% by weight of acrylonitrile and 10% by weight of monomethallyl ether of glycerine.

6. A copolymer of 87% by weight of acrylonitrile and 13% by weight of monoallyl ether of glycerine.

7. A copolymer of 75% by weight of acrylonitrile and 25% by weight of monoallyl ether of glycerine.

8. A process for preparing a copolymer of acrylonitrile and a compound selected from the group consisting of monoallyl ether of glycerine and monomethallyl ether of glycerine comprising heating a mixture containing from 70 to 92 parts by weight of acrylonitrile and from 30 to 8 parts by weight of a compound selected from the group consisting of monoallyl ether of glycerine and monomethallyl ether of glycerine, in the presence of a peroxide polymerization catalyst.

9. A process for preparing a copolymer of acrylonitrile and monoallyl ether of glycerine comprising heating a mixture of from 80 to 88 parts by weight of acrylonitrile and from 20 to 12 parts by weight of monoallyl ether of glycerine, in the presence of a peroxide polymerization catalyst.

10. A process for preparing a copolymer of acrylonitrile and monomethallyl ether of glycerine comprising heating a mixture of from 80 to 88 parts by weight of acrylonitrile and from 20 to 12 parts by weight of monomethallyl ether of glycerine, in the presence of a peroxide polymerization catalyst.

11. A process for preparing a copolymer of acrylonitrile and monoallyl ether of glycerine comprising heating a mixture of 80 parts by weight of acrylonitrile and 20 parts by weight of monoallyl ether of glycerine, in the presence of potassium persulfate.

12. A process for preparing a copolymer of acrylonitrile and monomethallyl ether of glycerine comprising heating a mixture of 80 parts by weight of acrylonitrile and 20 parts by weight of monomethallyl ether of glycerine, in the presence of potassium persulfate.

13. A process for preparing a copolymer of acrylonitrile and monoallyl ether of glycerine comprising heating a mixture of 75 parts by weight of acrylonitrile and 25 parts by weight of monoallyl ether of glycerine, in the presence of potassium persulfate.

14. A process for preparing a copolymer of acrylonitrile and monoallyl ether of glycerine comprising heating a mixture of 75 parts by weight of acrylonitrile and 25 parts by weight of monoallyl ether of glycerine, in the presence of benzoyl peroxide.

15. A copolymer of about 90% by weight of acrylonitrile and about 10% by weight of monoallyl ether of glycerine.

16. A composition comprising a copolymer of about 90% by weight of acrylonitrile and about 10% by weight of a 2-alkenyl dihydroxypropyl ether wherein the alkenyl grouping thereof contains from 3 to 4 carbon atoms, inclusive.

References Cited in the file of this patent

UNITED STATES PATENTS

| | | |
|---|---|---|
| 2,016,490 | Fikentscher | Oct. 8, 1935 |
| 2,605,258 | Rothrock | July 29, 1952 |

FOREIGN PATENTS

| | | |
|---|---|---|
| 398,173 | Great Britain | Sept. 1, 1933 |